Aug. 18, 1959  K. P. HILLEGASS  2,900,051
CAM ROLLER SELF-ENERGIZING DISC BRAKE
Filed April 24, 1958  2 Sheets-Sheet 2

INVENTOR.
KENNETH P. HILLEGASS
BY
R. L. Miller
ATTORNEY

United States Patent Office 2,900,051
Patented Aug. 18, 1959

2,900,051

CAM ROLLER SELF-ENERGIZING DISC BRAKE

Kenneth P. Hillegass, Copley, Ohio, assignor to The Goodyear Tire & Rubber Company, Akron, Ohio, a corporation of Ohio Application April 24, 1958, Serial No. 730,584

2 Claims. (Cl. 188—72)

This invention relates to self-energizing brakes, and, more particularly, to brakes of this type utilizing cam rollers to effect a wedging and braking action.

The general objects of the invention are to provide a relatively inexpensive and efficient brake of the cam roller, self-energizing type characterized by low initial and maintenance costs, small number of working parts, and positiveness of operation.

The foregoing objects of the invention, and other objects which will become apparent as the description proceeds, are achieved by the provision in a brake combination of a housing including a pair of stationary, axially-spaced, circular, opposed and radially-directed pressure surfaces, a rotary member mounted on an axis coincident to the axis of the surfaces, a pair of friction discs splined on the member and axially-spaced thereon and adapted to have frictional engagement with the surfaces, a pair of pressure plates mounted between the discs, means on the housing and on the peripheries of the pressure plates allowing limited arcuate movement of each pressure plate, a plurality of elliptical cam rollers circumferentially-spaced between the pressure plates, a cage carrying the rollers, teeth on the periphery of the rollers and cooperating teeth on the pressure plates, and power means for effecting relative rotation between the pressure plates to cause movement of the rollers in the direction to position the major axis of the rollers between the pressure plates and to move the plates against the discs and the discs against the surfaces and effect braking action.

For a better understanding of the invention, reference should be had to the accompanying drawings wherein.

Figure 1:
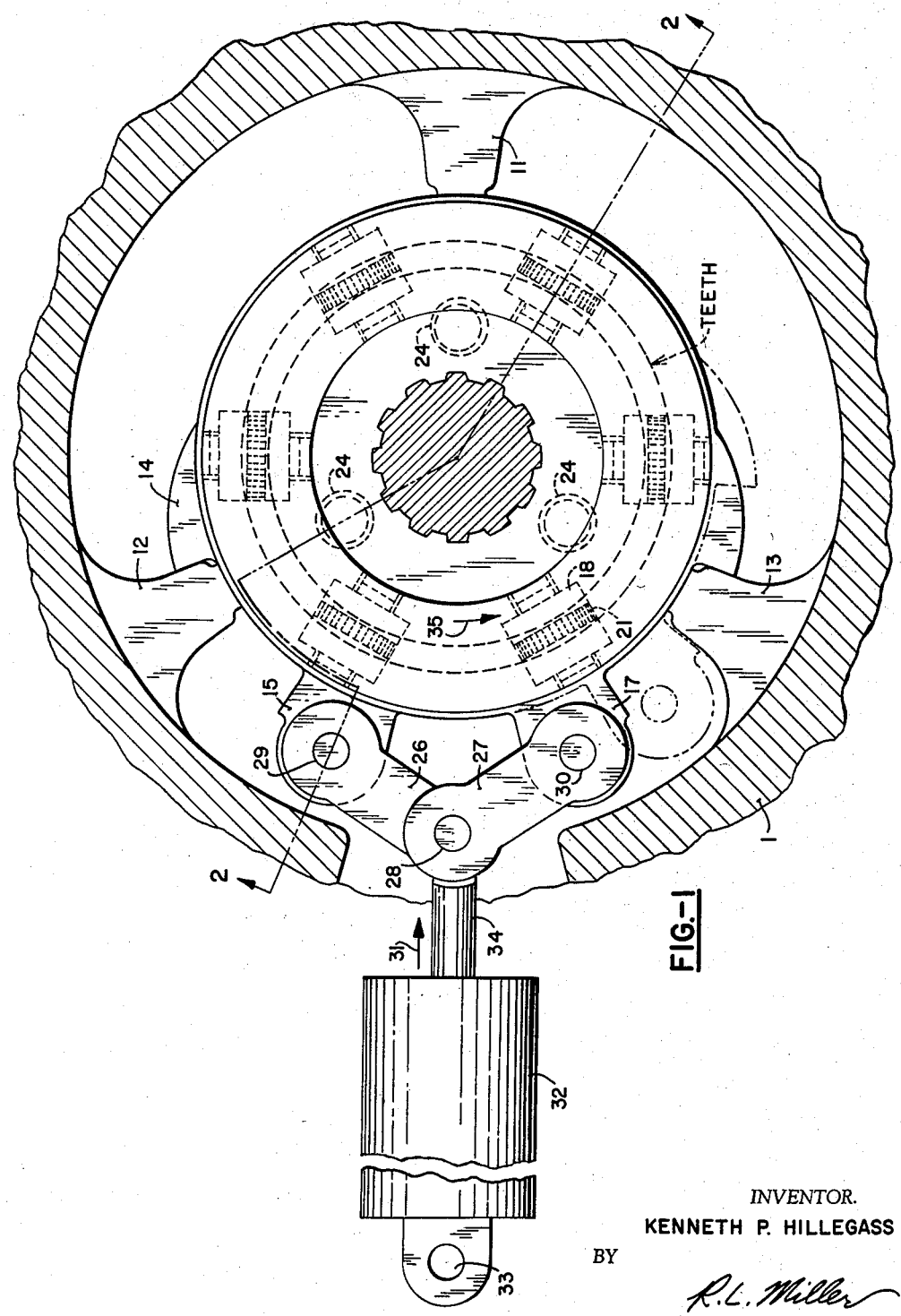
Fig. 1 is a diametric cross-sectional view taken substantially on line 1—1 of Fig. 2 and illustrating a typical embodiment of the brake incorporating the features of the invention.

In the drawings, the numeral 1 indicates a housing which is stationary and which has opposed and radially directed pressure surfaces 2 and 3. The pressure surface 3 is normally provided on a detachable housing part 4 secured, as by bolt means not shown, to the main housing.

A rotary member, such as a shaft 5, is positioned in suitable bearing means not shown so that its axis is coincident with the axis of the housing 1. Mounted on the shaft 5 at axially-spaced points thereon are a pair of friction discs 6 and 7. Spline means 8 on the shaft 5, and cooperating teeth on the discs 6 and 7 allow the discs to have axial movement on the shaft but insure rotation of the discs with the shaft.

Positioned between the discs 6 and 7 are a pair of pressure plates 9 and 10 adapted to engage with the discs 6 and 7 and effective to force the discs against the pressure surfaces 2 and 3, all as hereinafter described in detail. The pressure plates 9 and 10 are mounted for limited arcuate movement relative to each other and the housing 1 on axes coincident with the axis of the shaft 5. This is achieved by the provision of three circumferentially-spaced lugs or fingers 11, 12 and 13 formed integral with the housing part 4 and extending as shown in Figures 1 and 2 into sliding contact with the peripheries of the discs 9 and 10.

The disc 9 is limited in its arcuate movement by providing an abutment 14 thereon and an ear 15 thereon between which the lug or finger 12 extends, as seen in Fig. 1. In a like manner the disc 10 is limited in its arcuate movement by an abutment 16 thereon and by the ear 17 thereon between which extends the lug or finger 13, as shown in Fig. 1.

Figure 2:
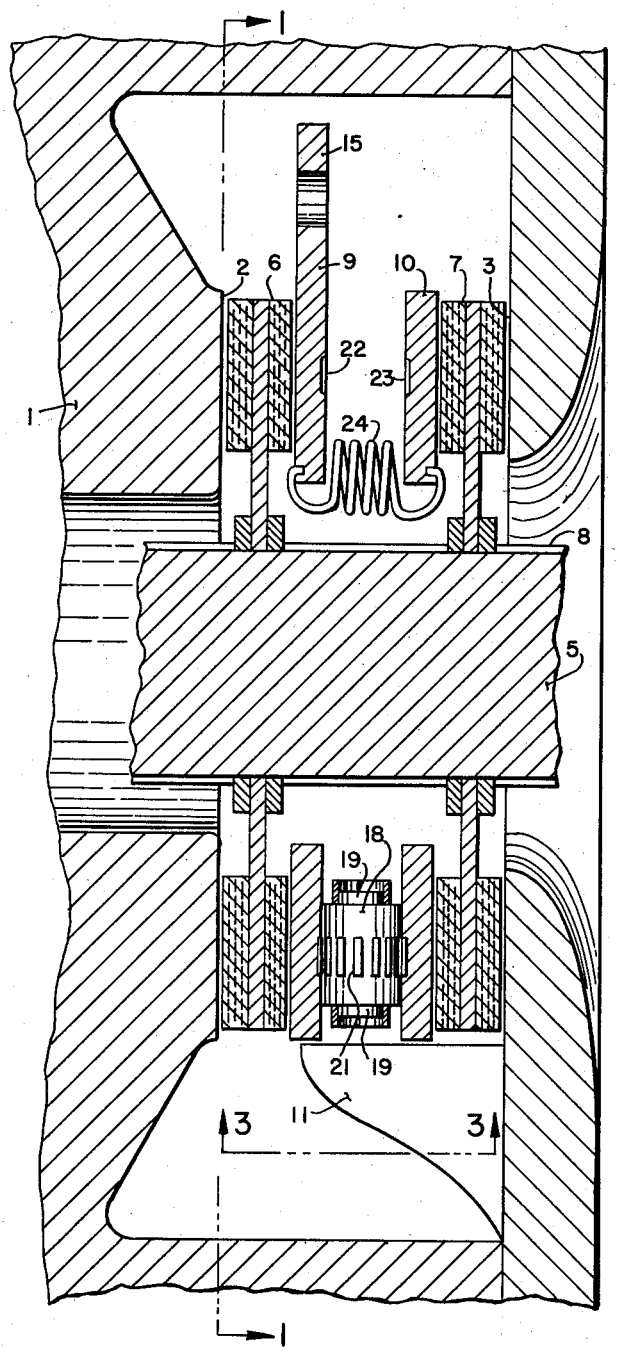
Fig. 2 is a cross-sectional view, taken on line 2—2 of Fig. 1, and partially broken away.
Figure 3:
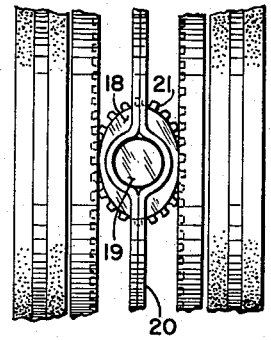
Fig. 3 is a fragmentary elevational view of the brake mechanism of Fig. 2 and taken substantially from the viewpoint of section line 3—3.

Positioned between the pressure plates 9 and 10 at a plurality of circumferentially-spaced points, for example six, are cam rollers 18, which as best seen in Figs. 2 and 3 have body portions of elliptical cross section with integral circular cross-section trunnions 19 at their ends. A cage, identified by the numeral 20, and formed of two appropriately ring-shaped sheet metal parts rotatably engages the trunnions 19 of the rollers 18 and supports all of the rollers as a unit.

In order to insure a positive driving and inter-engaging action between the cam rollers 18 and the pressure plates 9 and 10, the outer periphery of each roller 18 near the radial center thereof is formed with continuous gear teeth 21 and these engage with cooperating teeth formed on the opposed surfaces of the pressure plates 9 and 10 over their full circumferences, such teeth being indicated by the numerals 22 and 23.

At a plurality of points spaced circumferentially of the pressure plates 9 and 10, for example three, are positioned coil tension springs 24 having their ends hooked in recesses in the plates so as to hold the plates 9 and 10, cam rollers 18 and their associated cage 20 together as a unit, but with the springs 24 functioning to permit relative angular rotation of limited extent between the plates for the braking action, as hereinafter described.

In order to effect limited angular rotation between plates 9 and 10, and to create the braking action, a pair of toggle links 26 and 27 are provided which are pivotally connected by a pin 28 to each other with the opposite ends of the links being pinned at 29 and 30 in pivotal fashion to the lugs 15 and 17, respectively. Any suitable mechanism is then utilized to move the pin 28 in a direction of the arrow 31 to effect the relative angular movement of the plates 9 and 10. For example, a fluid pressure cylinder 32 may be utilized having the cylinder pivotally mounted on a pin 33 and having a piston rod 34 connected to the pin 28. Return spring means not shown will return the links 26 and 27 to the full line positions shown of inoperativeness upon release of the fluid pressure cylinder 32.

In the operation of the brake as described, it will be understood that when the cylinder 32 is operated in the direction of the arrow 31, the links 26 and 27 move with a toggle action to effect relative rotation between the plates 9 and 10 thereby causing the cam rollers 18 to roll between the plates 9 and 10. As the rollers 18 roll instead of having the minor axis of the ellipse between the plates 9 and 10 and the brake inoperative, as shown in Fig. 3, the rollers 18 move in the direction of presenting the major axis, or some portion thereof, between the plates 9 and 10 to thereby move the pressure plates 9 and 10 into engagement with the friction discs 6 and 7 and to move these friction discs against the pressure surfaces 2 and 3 of the housing to thereby apply the brake. Each friction disc 6 or 7 is, in effect, squeezed between its associated pressure surface and pressure plate to thereby stop the rotation of the shaft 5 carrying the friction discs 6 and 7. In the actual use of the brake it will be recognized that the pressure of the plates 9 and 10 against their respective friction discs tends to rotate the pressure plates in the same direction as the direction of rotation of the friction discs. Assuming that the direction of rotation of the friction discs 6 and 7 is that shown by the arrow 35 in Fig. 1, then pressure plate 9 moves in this same direction to move its abutment 14 into engagement with the lug 12 on housing part 4. Of course, abutment 14 may already be in engagement with lug 12 (from a previous braking operation) and it will not have to move.

Now with pressure plate 9 held against rotation with the friction disc 6 because its abutment 14 has engaged with lug 12 on the housing, pressure plate 10 still tends to rotate with its friction disc 7, and ear 17 is still spaced from lug 13 so that plate 10 can rotate or tend to rotate with disc 7. This action causes the self-energizing feature of the brake to come into play. Pressure plate 9 is held against rotation in the direction of the arrow 35 because its abutment 14 has engaged with lug 12 of the housing 1, but pressure plate 10 wishes to continue in the direction of rotation of the arrow 35 because of the engagement of the friction disc 7 therewith. This tends to increase the distance between the pins 29 and 30 on the ears 15 and 17 respectively and tends to cause further relative arcuate rotation between the plates 9 and 10 causing the cam rollers 18 to turn further towards their major axes and to apply, with self-energizing action, additional expanding force between the plates 9 and 10 to increase the braking action on the friction discs 6 and 7.

The positive drive between the cam rollers 18 and the pressure plates 9 and 10 is effected by means of the gear teeth 21, 22 and 23 on the respective parts so that there is no slippage.

The same self-energizing action described is achieved should the shaft 5 be rotating in the opposite direction, in this case the abutment 16 engaging with the lug 13 and ear 15 tending to move closer to lug 12 to thereby tend to separate the pins 29 and 30 and thereby increase the axial distance between the plates 9 and 10, as aforesaid.

It has been found that the brake of the invention is characterized by an ease of brake release. In certain types of self-energizing brakes wedging actions result which tend to make the brakes grab and chatter, and with the brake often being difficult to release due to the wedging action in setting up. It has been found that relatively light brake return forces will release the brake of the present invention in spite of its self-energizing characteristics.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in a brake, of a housing including a pair of stationary, axially-spaced, circular, opposed and radially-directed pressure surfaces, a rotary member mounted on an axis coincident to the axis of the surfaces, a pair of friction discs splined on the member for axial sliding movement and axially-spaced thereon and adapted to have frictional engagement with the surfaces, a pair of pressure plates mounted between the discs, means on the housing and on the peripheries of the pressure plates allowing limited arcuate movement of each pressure plate, a plurality of elliptical cam rollers circumferentially spaced between the pressure plates, an annular cage concentric with the rotary member and independent thereof carrying the rollers, said cage being spaced from said pressure plates and having bearings for rotatably engaging trunnions formed on ends of said cam rollers, teeth on the periphery of the rollers and cooperating teeth on the pressure plates, and power means for effecting relative rotation between the pressure plates to cause movement of the rollers in the direction to position the major axis of the rollers between the pressure plates to move the plates against the discs and the discs against the surfaces and effect braking action.

2. The combination in a brake of a housing including a pair of stationary axially spaced circular opposed and radially-directed pressure surfaces, a rotary shaft member mounted on an axis coincident with the axis of the surfaces and extending between said surfaces, a pair of friction discs splined on said shaft member for axial sliding movement and axially spaced from each other, said discs having friction facings for engagement with said surfaces, a pair of pressure plates mounted between the discs, means on the housing and on the peripheries of the pressure plates allowing limited arcuate movement of each pressure plate, a plurality of elliptical cam rollers circumferentially spaced between the pressure plates, an annular cage concentric with the axis of the shaft member and carrying the rollers, said cage being spaced from said pressure plates and having bearings for rotatably engaging trunnions on the ends of said cam rollers, an annular row of gear teeth formed on each pressure plate, cooperating teeth on the elliptical faces of said cam rollers for engaging the pressure plates, spring means normally holding said pressure plates in disengaged position, and toggle means for shifting said pressure plates circumferentially relative to each other to spread and engage said pressure plates with said discs.

References Cited in the file of this patent

UNITED STATES PATENTS

| | | |
|---|---|---|
| 1,696,879 | Chase | Dec. 25, 1928 |
| 1,783,741 | Mears | Dec. 2, 1930 |
| 2,096,854 | Kolarovic | Oct. 26, 1937 |
| 2,256,725 | Pierce et al. | Sept. 23, 1941 |
| 2,387,039 | Parrett | Oct. 16, 1945 |
| 2,831,552 | Kershner | Apr. 22, 1958 |
| 2,852,106 | Cull et al. | Sept. 16, 1958 |